(12) United States Patent
Murthy et al.

(10) Patent No.: US 12,346,649 B1
(45) Date of Patent: Jul. 1, 2025

(54) SYSTEMS AND METHODS FOR USING A TEXT-BASED DOCUMENT FORMAT TO PROVIDE CONTEXT FOR A LARGE LANGUAGE MODEL

(71) Applicant: Instabase, Inc., Dover, DE (US)

(72) Inventors: Vineeth Chinmaya Murthy, Bengaluru (IN); Rafal Powalski, Warsaw (PL); Atinderpal Singh, Bathinda (IN); Hariharan Thirugnanam, Bangalore (IN); Kikani Prashant Vinodrai, Junagadh (IN)

(73) Assignee: Instabase, Inc., Dover, DE (US)

( * ) Notice: Subject to any disclaimer, the term of this patent is extended or adjusted under 35 U.S.C. 154(b) by 81 days.

(21) Appl. No.: 18/316,803

(22) Filed: May 12, 2023

(51) Int. Cl.
| | |
|---|---|
| *G06V 30/412* | (2022.01) |
| *G06F 40/117* | (2020.01) |
| *G06F 40/177* | (2020.01) |
| *G06F 40/189* | (2020.01) |
| *G06F 40/30* | (2020.01) |
| *G06V 30/414* | (2022.01) |

(52) U.S. Cl.
CPC .......... *G06F 40/117* (2020.01); *G06F 40/177* (2020.01); *G06F 40/189* (2020.01); *G06F 40/30* (2020.01); *G06V 30/412* (2022.01); *G06V 30/414* (2022.01)

(58) Field of Classification Search
CPC ....... G06F 40/117; G06F 40/189; G06F 40/30
See application file for complete search history.

(56) References Cited

U.S. PATENT DOCUMENTS

| | | | |
|---|---|---|---|
| 5,774,584 A * | 6/1998 | Matsumoto | G06V 30/412 382/193 |
| 5,848,184 A | 12/1998 | Taylor | |
| 5,898,795 A | 4/1999 | Bessho | |
| 7,689,431 B1 | 3/2010 | Carmel | |
| 7,707,488 B2 * | 4/2010 | Gurcan | G06F 40/103 715/228 |
| 7,720,318 B1 | 5/2010 | Phinney | |
| 7,725,423 B1 | 5/2010 | Pricer | |
| 8,254,681 B1 | 8/2012 | Poncin | |
| (Continued) | | | |

OTHER PUBLICATIONS

Chaudhuri et al., "Extraction of type style-based meta-information from imaged documents", IJDAR (2001) 3: 138-149. (Year: 2001).

(Continued)

*Primary Examiner* — Benjamin Smith
(74) *Attorney, Agent, or Firm* — Esplin & Associates, PC (57) ABSTRACT

Systems and methods for using a text-based document format to provide context for a large language model are disclosed. Exemplary implementations may: obtain an electronic source document in an electronic format; convert the electronic source document to a mark-up document in the text-based document format; obtain a large language model; fine-tune the large language model through a set of documents that are encoded in the text-based document format; provide the mark-up document to the large language model as input for user-directed extraction of information; present a user interface to a user to enable the user to control the user-directed extraction of the information from the mark-up document; and/or other steps.

20 Claims, 5 Drawing Sheets

(56) References Cited

U.S. PATENT DOCUMENTS

| | | | |
|---|---|---|---|
| 8,463,040 B2* | 6/2013 | Le Glaunec | G06V 30/412 |
| | | | 382/176 |
| 9,275,030 B1 | 3/2016 | Fang | |
| 9,412,017 B1* | 8/2016 | Huang | H04N 23/60 |
| 9,418,315 B1* | 8/2016 | Keogh | G06F 16/5846 |
| 9,607,058 B1 | 3/2017 | Gupta | |
| 9,753,908 B2* | 9/2017 | Gitlin | G06F 40/143 |
| 10,037,581 B1* | 7/2018 | Huang | G06V 10/10 |
| 10,241,992 B1* | 3/2019 | Middendorf | G06F 16/258 |
| 10,679,089 B2 | 6/2020 | Annis | |
| 10,789,422 B2* | 9/2020 | Banaszak | G06F 40/174 |
| 10,878,195 B2* | 12/2020 | Duta | G06V 30/153 |
| 10,909,311 B2* | 2/2021 | Middendorf | G06F 40/274 |
| 11,062,133 B2* | 7/2021 | Foncubierta Rodriguez | |
| | | | G06N 20/20 |
| 11,074,418 B2* | 7/2021 | Ito | G06F 40/58 |
| 11,074,442 B2* | 7/2021 | Semenov | G06V 30/412 |
| 11,113,464 B2* | 9/2021 | Banaszak | G06F 40/174 |
| 11,113,518 B2* | 9/2021 | Chua | G06F 18/2413 |
| 11,200,413 B2* | 12/2021 | Burdick | G06F 40/284 |
| 11,295,072 B2* | 4/2022 | Sundar | G06F 40/284 |
| 11,315,353 B1 | 4/2022 | Cahn | |
| 11,392,753 B2* | 7/2022 | Sirangimoorthy | G06F 40/106 |
| 11,403,488 B2* | 8/2022 | Tang | G06F 18/2148 |
| 11,423,042 B2* | 8/2022 | Sirangimoorthy | G06F 16/345 |
| 11,599,711 B2* | 3/2023 | Zhong | G06V 30/413 |
| 11,625,934 B2* | 4/2023 | Tiyyagura | G06F 40/295 |
| | | | 382/112 |
| 11,651,150 B2* | 5/2023 | Paliwal | G06V 30/274 |
| | | | 382/103 |
| 11,663,842 B2* | 5/2023 | Talwar | G06V 30/412 |
| | | | 382/176 |
| 11,670,067 B2* | 6/2023 | Ito | G06F 40/58 |
| | | | 715/246 |
| 11,763,073 B2* | 9/2023 | Doms | G06F 16/2282 |
| | | | 715/227 |
| 11,829,401 B2* | 11/2023 | Deng | G06F 16/2365 |
| 11,977,533 B2* | 5/2024 | Thompson | G06V 30/412 |
| 11,977,534 B2* | 5/2024 | Thompson | G06V 10/70 |
| 12,087,072 B2* | 9/2024 | Talwar | G06V 30/414 |
| 12,093,300 B1* | 9/2024 | Zhou | G06F 40/186 |
| 12,154,361 B2* | 11/2024 | Chen | G06V 10/44 |
| 12,175,198 B2* | 12/2024 | Sun | G06F 40/279 |
| 2002/0064316 A1 | 5/2002 | Takaoka | |
| 2004/0181749 A1* | 9/2004 | Chellapilla | G06F 40/174 |
| | | | 715/222 |
| 2004/0223648 A1 | 11/2004 | Hoene | |
| 2005/0289182 A1 | 12/2005 | Pandian | |
| 2008/0148144 A1 | 6/2008 | Tatsumi | |
| 2008/0212901 A1 | 9/2008 | Castiglia | |
| 2008/0291486 A1 | 11/2008 | Isles | |
| 2009/0076935 A1 | 3/2009 | Knowles | |
| 2009/0132590 A1 | 5/2009 | Huang | |
| 2012/0072859 A1 | 3/2012 | Wang | |
| 2012/0204103 A1 | 8/2012 | Stevens | |
| 2014/0200880 A1 | 7/2014 | Neustel | |
| 2014/0214732 A1 | 7/2014 | Carmeli | |
| 2015/0012422 A1 | 1/2015 | Ceribelli | |
| 2015/0078671 A1* | 3/2015 | van Deventer | G06V 30/412 |
| | | | 382/217 |
| 2015/0169951 A1 | 6/2015 | Khintsitskiy | |
| 2015/0169995 A1 | 6/2015 | Panferov | |
| 2015/0278197 A1 | 10/2015 | Bogdanova | |
| 2016/0014299 A1 | 1/2016 | Saka | |
| 2016/0104167 A1* | 4/2016 | Vanko | G06Q 40/03 |
| | | | 705/317 |
| 2016/0275526 A1 | 9/2016 | Becanovic | |
| 2018/0101750 A1* | 4/2018 | Soldevila | G06V 30/18057 |
| 2018/0189592 A1 | 7/2018 | Annis | |
| 2018/0244098 A1* | 8/2018 | Harada | G06F 3/1211 |
| 2018/0329890 A1* | 11/2018 | Ito | G06F 40/58 |
| 2019/0286900 A1 | 9/2019 | Pepe, Jr. | |
| 2019/0340240 A1* | 11/2019 | Duta | G06V 30/15 |
| 2020/0042785 A1* | 2/2020 | Burdick | G06V 30/416 |
| 2020/0089946 A1* | 3/2020 | Mallick | G06V 30/416 |
| 2020/0104359 A1 | 4/2020 | Patel | |
| 2020/0348809 A1* | 11/2020 | Drescher | G06V 30/413 |
| 2020/0364343 A1 | 11/2020 | Atighetchi | |
| 2020/0380071 A1* | 12/2020 | Sundar | G06F 40/174 |
| 2020/0401798 A1* | 12/2020 | Foncubierta Rodriguez | |
| | | | G06F 16/51 |
| 2020/0410231 A1* | 12/2020 | Chua | G06F 18/2413 |
| 2021/0064861 A1* | 3/2021 | Semenov | G06F 17/16 |
| 2021/0158034 A1* | 5/2021 | Deng | G06F 40/114 |
| 2021/0240976 A1* | 8/2021 | Tiyyagura | G06V 30/414 |
| 2021/0256253 A1* | 8/2021 | Chen | G06F 18/214 |
| 2021/0258448 A1 | 8/2021 | Yuusuke | |
| 2021/0295101 A1* | 9/2021 | Tang | G06V 30/412 |
| 2021/0397798 A1* | 12/2021 | Ito | G06F 40/58 |
| 2022/0138460 A1* | 5/2022 | Talwar | G06V 30/153 |
| | | | 382/176 |
| 2022/0180044 A1* | 6/2022 | Zhong | G06F 40/157 |
| 2022/0318224 A1* | 10/2022 | Thompson | G06V 10/70 |
| 2022/0319217 A1* | 10/2022 | Paliwal | G06V 10/82 |
| 2022/0335240 A1* | 10/2022 | Smock | G06N 3/045 |
| 2022/0398858 A1 | 12/2022 | Cahn | |
| 2022/0405265 A1* | 12/2022 | Thompson | G06V 30/412 |
| 2023/0022677 A1* | 1/2023 | Sun | G06V 30/412 |
| 2023/0057485 A1* | 2/2023 | Doms | G06V 30/19093 |
| 2023/0095673 A1* | 3/2023 | Dharmasiri | G06V 10/82 |
| | | | 382/157 |
| 2023/0140017 A1* | 5/2023 | Kim | G06F 16/93 |
| | | | 715/243 |
| 2023/0260309 A1* | 8/2023 | Jamshidikhezeli | G06V 30/414 |
| | | | 382/229 |
| 2023/0260311 A1* | 8/2023 | Talwar | G06V 30/153 |
| | | | 382/176 |
| 2023/0290130 A1* | 9/2023 | Ding | G06V 30/413 |
| 2023/0334889 A1 | 10/2023 | Cahn | |
| 2023/0418981 A1* | 12/2023 | Ward | G06F 21/6254 |
| 2023/0419705 A1* | 12/2023 | Truscott | G06F 9/453 |
| 2024/0104951 A1* | 3/2024 | Gu | G06V 30/19173 |
| 2024/0127617 A1* | 4/2024 | Amamou | G06V 30/19133 |
| 2024/0202428 A1* | 6/2024 | Lu | G06F 40/205 |
| 2024/0220725 A1* | 7/2024 | Gueret | G06F 40/30 |
| 2024/0311406 A1* | 9/2024 | Narechania | G06F 16/3329 |
| 2024/0311546 A1* | 9/2024 | Maschmeyer | G06F 40/169 |
| 2024/0311563 A1* | 9/2024 | Somech | G06F 40/279 |
| 2024/0311581 A1* | 9/2024 | Narechania | G06F 40/279 |
| 2024/0355134 A1* | 10/2024 | Huang | G06V 30/412 |

OTHER PUBLICATIONS

Doermann et al., "Image Based Typographic Analysis of Documents", Proceedings of 2nd International Conference on Document Analysis and Recognition, pp. 769-773, 1993 IEEE. (Year: 1993).

Shafait ("Document image analysis with OCRopus," IEEE 13th International Mulititopic Conference; Date of Conference: Dec. 14-15, 2009) (Year: 2009) 6 pages.

Singh et al. (A Proposed Approach for Character Recognition Using Document Analysis with OCR, Second InternationalConference on Intelligent Computing and Control Systems: Date of Conference: Jun. 14-15, 2018) (Year: 2018) 6 pages.

Slavin et al., "Matching Digital Copies of Documents Based on OCR", 2019 XXI International Conference Complex Systems: Control and Modeling Problems (CSCMP), pp. 177-181, published on Sep. 1, 2019. (Year: 2019).

* cited by examiner

BIG BANK  
P O Box 1  
Somecity, XY

Date: 02/01/XX through 02/08/XX  
Account Number: 000 00 300 02 001

CUSTOMER SERVICE INFORMATION  
Website     bigbank.com  
Service center    1-800-123-4567  
International calls   1-123-456-7890

John Johnson  
123 Main Street  
Anytown, USA

CHECKING SUMMARY     AMOUNT — 37  
Beginning Balance     $1000.00 — 36  
Deposits and Additions     100.00  
Checks Paid     -50.00  
ATM & Debit Card Withdrawals     -200.00  
Electronic Withdrawals     0  
Fees     -10.00  
Ending Balance     $840.00

CHECKS PAID

| CHECK NUMBER | DATE PAID | AMOUNT |
|---|---|---|
| 1234 | 02/03 | $50.00 |

TRANSACTION DETAIL

| DATE | DESCRIPTION | AMOUNT |
|---|---|---|
| 02/04 | ATM withdrawal | $200.00 |

SYSTEMS AND METHODS FOR USING A TEXT-BASED DOCUMENT FORMAT TO PROVIDE CONTEXT FOR A LARGE LANGUAGE MODEL

FIELD OF THE DISCLOSURE

The present disclosure relates to systems and methods for using a text-based document format to provide context for a large language model.

BACKGROUND

Extracting information from electronic documents is known. Converting between electronic file formats is known. Large language models are known.

SUMMARY

One aspect of the present disclosure relates to a system configured for using a text-based document format to provide context for a large language model. The system may include one or more hardware processors configured by machine-readable instructions. The system may be configured to obtain an electronic source document in an electronic format. The system may be configured to convert the electronic source document to a mark-up document in the text-based document format. The system may be configured to obtain a large language model. The system may be configured to fine-tune the large language model through a set of documents that are encoded in the text-based document format. The system may be configured to provide the mark-up document to the large language model as input for user-directed extraction of information. The system may be configured to present a user interface to a user to enable the user to control the user-directed extraction of the information from the mark-up document, and/or perform other steps.

Another aspect of the present disclosure relates to a method for using a text-based document format to provide context for a large language model. The method may include obtaining an electronic source document in an electronic format. The method may include converting the electronic source document to a mark-up document in the text-based document format. The method may include obtaining a large language model. The method may include fine-tuning the large language model through a set of documents that are encoded in the text-based document format. The method may include providing the mark-up document to the large language model as input for user-directed extraction of information. The method may include presenting a user interface to a user to enable the user to control the user-directed extraction of the information from the mark-up document. The method may include other steps.

As used herein, any association (or relation, or reflection, or indication, or correspondency) involving servers, processors, client computing platforms, documents, formats, blocks of content, characters, presentations, extracted information, user interfaces, user interface elements, models, representations, grids, positions, coordinates, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
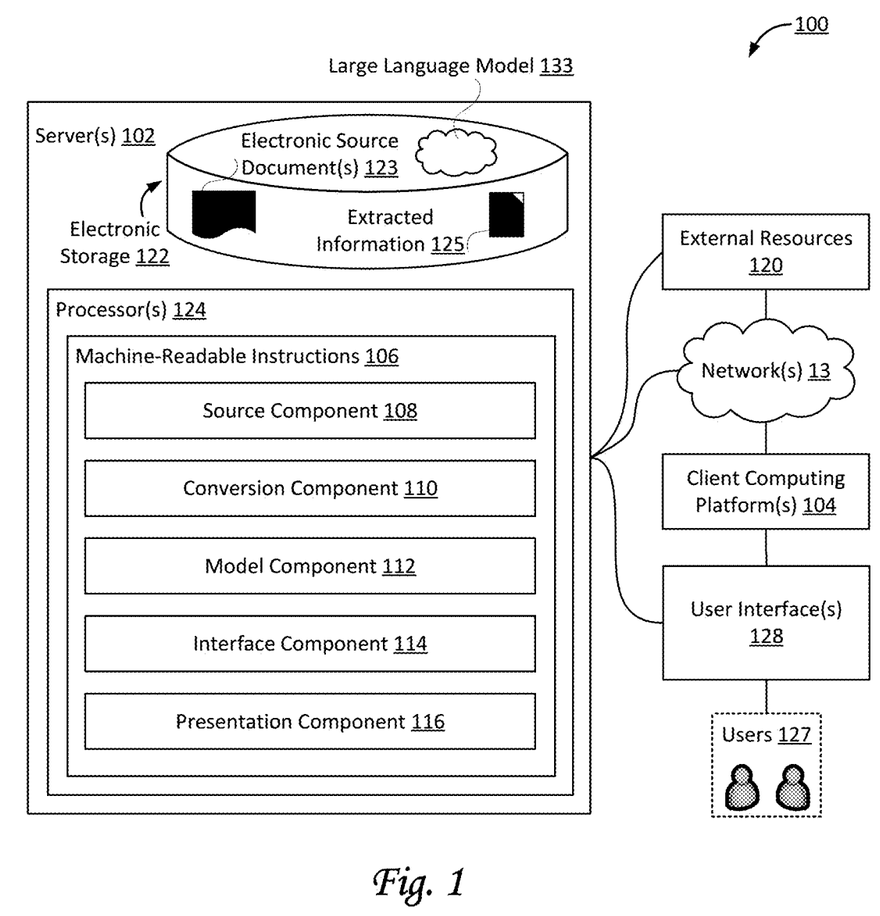
FIG. 1 illustrates a system configured for using a text-based document format to provide context for a large language model, in accordance with one or more implementations.

FIG. 1 illustrates a system 100 configured for using a text-based document format to provide context for a large language model, in accordance with one or more implementations. In some implementations, system 100 may include one or more servers 102, one or more client computing platforms 104, one or more user interfaces 128, external resources 120, a large language model (LLM) 133, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 127 may access system 100 via client computing platform(s) 104. In some implementations, individual users may be associated with individual client computing platforms 104. For example, a first user may be associated with a first client computing platform 104, a second user may be associated with a second client computing platform 104, and so forth.

In some implementations, individual user interfaces 128 may be associated with individual client computing platforms 104. For example, a first user interface 128 may be associated with a first client computing platform 104, a second user interface 128 may be associated with a second client computing platform 104, and so forth.

Server(s) 102 may be configured by machine-readable instructions 106. Machine-readable instructions 106 may include one or more instruction components. The instruction components may include computer program components. The instruction components may include one or more of a source component 108, a conversion component 110, a model component 112, an interface component 114, a presentation component 116, and/or other instruction components.

Source component 108 may be configured to obtain and/or retrieve documents, including but not limited to electronic source documents, including scanned images, captured photographs, and/or other documents in electronic format. As used herein, the terms "electronic document" and "electronic source document", and derivatives thereof, may be used interchangeably. By way of non-limiting example, the electronic formats of the electronic documents may be one or more of Portable Document Format (PDF), Portable Network Graphics (PNG), Tagged Image File Format (TIF or TIFF), Joint Photographic Experts Group (JPG or JPEG), and/or other formats. Electronic documents may be stored and obtained as electronic files. In some implementations, an electronic document may be a scanned and/or photographed version of an original paper document and/or otherwise physical original document, or a copy of an original digital document. In some implementations, original documents may have been published, generated, produced, communicated, and/or made available by a business entity and/or government agency. Business entities may include corporate entities, non-corporate entities, and/or other entities. For example, an original document may have been communicated to customers, clients, and/or other interested parties. By way of non-limiting example, a particular original document may have been communicated by a financial institution to an account holder, by an insurance company to a policy holder or affected party, by a department of motor vehicles to a driver, etc. In some implementations, original documents may include financial reports, financial records, and/or other financial documents.

As used herein, documents may be referred to as "source documents" when the documents are originally published, generated, produced, communicated, and/or made available, or when the documents are copies thereof. Alternatively, and/or simultaneously, documents may be referred to as "source documents" when the documents are a source of human-readable information, or a basis or a container for human-readable information.

In some implementations, one or more electronic formats used for the electronic documents may encode visual information that represents human-readable information. For example, the human-readable information may be positioned on multiple line positions. Individual line positions may correspond to individual vertical locations or positions on a page (i.e., different words or characters may be on the same line of their vertical location or position is the same or similar). In some implementations, the visual information may include one or more blocks of content, such as, e.g., a first block of content, a second block of content, and so forth. Blocks of content may represent human-readable information, such as characters, words, dates, amounts, phrases, etc. In a particular case, different blocks of content may be (positioned) on different lines or line positions. For example, the first block of content may be positioned above or below the second block of content. For example, a third block of content may be positioned above or below a fourth block of content. In a particular example, the first block of content and the second block of content may have a particular horizontal alignment with respect to each other (on different lines). For example, the particular horizontal alignment may be left-aligned (where the left-most characters in each block of content line up above or below each other), right-aligned (where the right-most characters in each block of content line up above or below each other), or centered (where the characters in the center of each block of content line up above or below each other). As an example, two characters could be vertically aligned if they are positioned on the same line, so neither is above or below the other. For example, the elements in a row of a table may be vertically aligned, and the elements in a column of a table may be horizontally aligned.

In some implementations, one or more electronic formats used for the electronic documents may be such that, upon presentation of the electronic documents through user interfaces 128, the presentation(s) include human-readable information. By way of non-limiting example, human-readable information may include any combination of numbers, letters, diacritics, symbols, punctuation, and/or other information (jointly referred to herein as "characters"), which may be in any combination of alphabets, syllabaries, and/or logographic systems. In some implementations, characters may be grouped and/or otherwise organized into groups of characters (e.g., any word in this disclosure may be an example of a group of characters, particularly a group of alphanumerical characters). For example, a particular electronic source document 123 may include multiple groups of characters, such as, e.g., a first group of characters, a second group of characters, a third group of characters, a fourth group of characters, and so forth. Groups of characters may be included in blocks of content.

The electronic formats may be suitable and/or intended for human readers, and not, for example, a binary format that is not suitable for human readers. For example, the electronic format referred to as "PDF" is suitable and intended for human readers when presented using a particular application (e.g., an application referred to as a "pdf reader"). In some implementations, particular electronic source document 123 may represent one or more of a bank statement, a financial record, a photocopy of a physical document from a government agency, and/or other documents. For example, a particular electronic source document 123 may include a captured and/or generated image and/or video. For example, a particular electronic source document 123 may be a captured and/or generated image. The electronic documents obtained by source component 108 may have a particular size and/or resolution.

Referring to FIG. 1, conversion component 110 may be configured to convert documents from one (electronic) format into another (electronic) format. In the process conversion component 110 may create and/or generate a new document (e.g., a mark-up document). For example, conversion component 110 may convert an electronic source document into a new document in a text-based document format. The text-based document format may support a (subset of a) mark-up language. In some implementations, the supported mark-up language may be a subset of HyperText Markup Language (HTML). In some implementations, the supported mark-up language may be a subset of eXtensible Markup Language (XML). In some implementations, the supported mark-up language may be another mark-up language, or a subset thereof. In some implementations, the supported mark-up language may include one or more of explicit presentation semantics, implicit presentation semantics, and/or other presentation semantics. In some implementations, the text-based document format may use fixed-width character positions. In some implementations, the text-based document format may use a grid of fixed-width character positions. For example, each position may be unique indicated by X-Y coordinates. For example, each position or coordinate may contain (or be occupied by) exactly one character. By virtue of using fixed-width character positions, a character having an X-position or coordinate of "10" on line "n" would be horizontally aligned with another character having an X-position of coordinate of "10" on a different line, such as "n+1" or "n−1". For example, the elements in a row of a table may be vertically aligned by virtue of having the same or a similar Y-coordinate, and the elements in a column of a table may be horizontally aligned by virtue of having the same or a similar X-coordinate (for the left-most, right-most, or center character in those elements, depending on the particular horizontal alignment for the column elements).

By way of non-limiting example, explicit presentation semantics may include tags (e.g., readable information that is not intended to be presented to a reader, but that informs or indicates a characteristic of such a presentation) for one or more presentation characteristics such as font type, font size, font color, bold/italics/underlined/strikethrough/etc. (which may be referred to as "typographical emphasis"), latter case, capitalization, margins, spacing, headers, footers, and/or other commands and/or instructions for the presentation of a document, including formatting. For example, tags of "<b>" and "</b>" may indicate the beginning and ending of a group of characters to be presented in a bold font. By way of non-limiting example, implicit presentation semantics may be based on the position of a character in a mark-up document. For example, characters directly after a new-line (or at the left-hand side of the document) are presented at the left edge of a presentation. For example, a second character, in the mark-up document, to the right of a first character may be presented as such in the presentation. For example, a second character, in the mark-up document, below a first character may be presented as such in the presentation. For example, a second character, in the mark-up document, above a first character may be presented as such in the presentation. In some implementations, implicit presentation semantics may indicate or correspond to horizontal placements and vertical placements of characters in the presentation. Conversion component 110 may be configured such that human-readable information in the blocks of content of a particular electronic source document is included in the corresponding mark-up document. In some implementations, conversion component 110 may be configured such that human-readable information in the blocks of content of a particular electronic source document is included in the corresponding mark-up document so as to preserve relative horizontal alignment. For example, the particular horizontal alignment between the first block of content and the second block of content encoded in the electronic source document may be preserved. The corresponding mark-up document may include a first set of characters that corresponds to the first block of content and a second set of characters that corresponds to the second block of content. A first horizontal position of the first set of characters and a second horizontal position of the second set of characters within the mark-up document may reflect the particular horizontal alignment between the first block of content and the second block of content. Accordingly, if the first and second block of content are left-aligned with each other, the first and second set of characters in the mark-up document may be left-aligned with each other, and so forth for other horizontal alignments.

Figure 3A:
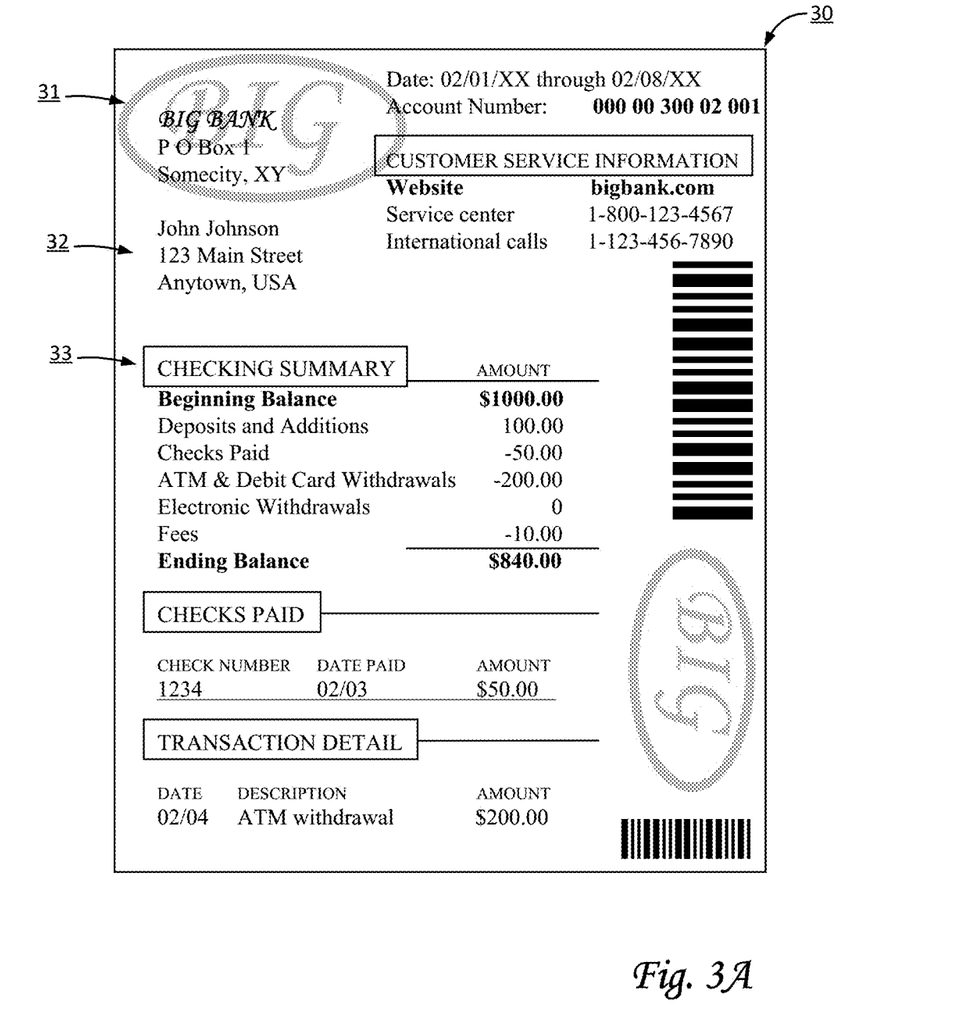
FIG. 3A and FIG. 4A illustrate exemplary electronic documents as may be used in a system configured for using a text-based document format to provide context for a large language model, in accordance with one or more implementations.

By way of non-limiting example, FIG. 3A illustrates an exemplary electronic source document 30 as may be used in system 100 (of FIG. 1), in accordance with one or more implementations. Exemplary electronic source document 30 may represent a bank statement from a particular bank, intended for a particular account holder, regarding a particular account of the particular account holder with the particular bank. Exemplary electronic source document 30 includes many content blocks representing human-readable information, including various familiar elements for a bank statement, such as, by way of non-limiting example, the bank's name, address, and logo of the bank as indicated by an indicator 31, an account holder's name and address as indicated by an indicator 32, an overview of checking account information (including, for example, beginning account balance for a particular period and ending account balance for the particular period) as indicated by an indicator 33, and other familiar elements of a bank statement.

Figure 3B:
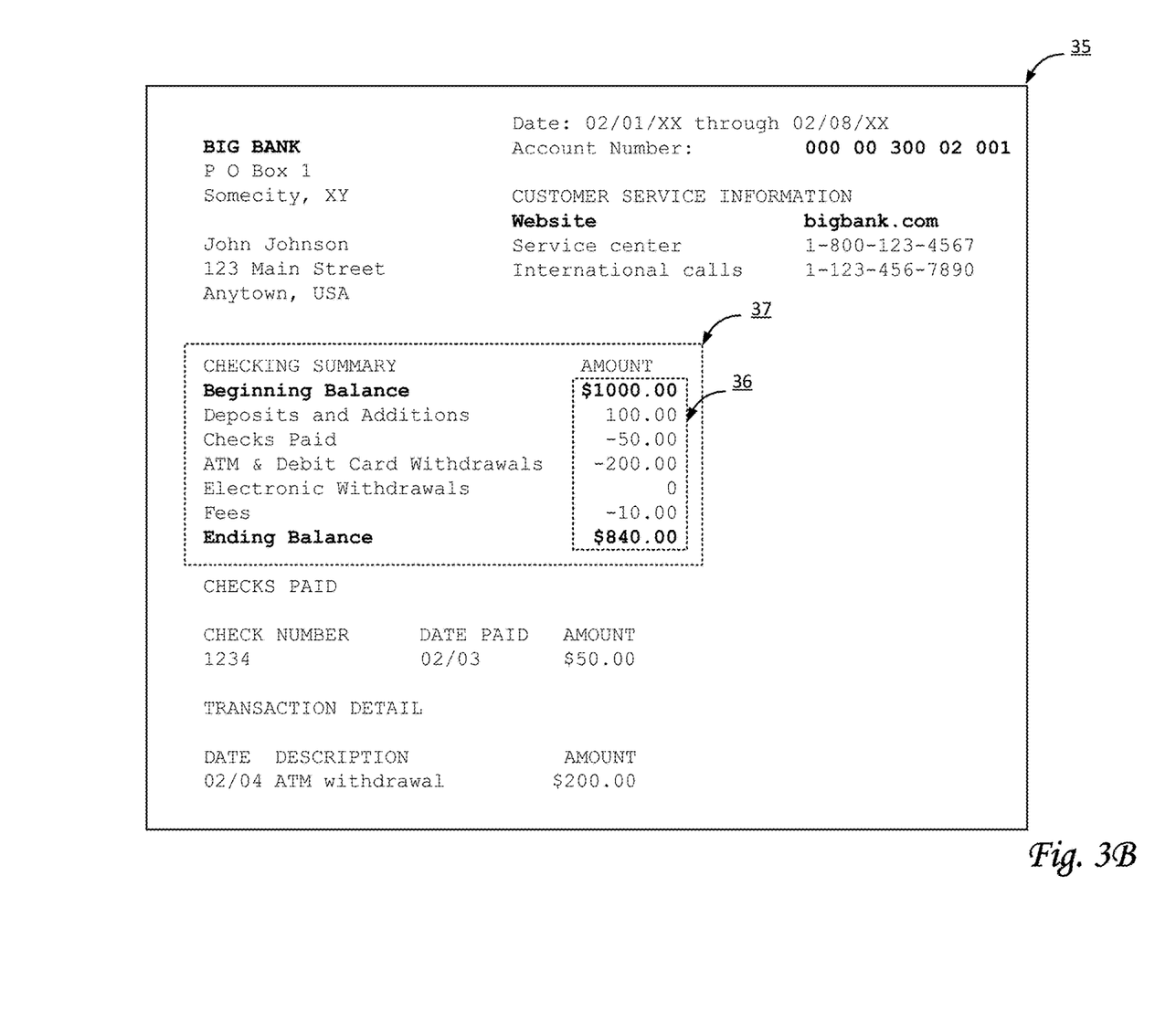
FIG. 3B and FIG. 4B illustrate exemplary mark-up documents as may be used in a system configured for using a text-based document format to provide context for a large language model, in accordance with one or more implementations.

By way of non-limiting example, FIG. 3B illustrates an exemplary mark-up document 35 as may be used in system 100 (of FIG. 1), in accordance with one or more implementations. Exemplary mark-up document 35 may have been created from exemplary electronic source document 30 in FIG. 3A, by converting that document to a text-based document format (e.g., by conversion component 110 in FIG. 1). The sets of characters in exemplary mark-up document 35 correspond to content blocks in exemplary electronic source document 30 in FIG. 3A. For example, a column 36 of right-aligned sets of characters (in this case, numerical information such as amounts of currency) corresponds to certain content blocks in exemplary electronic source document 30 in FIG. 3A. As depicted, column 36 is part of a table 37. For example, the set of characters "Beginning Balance" form a row label, the set of characters "AMOUNT" form a column label, and the set of characters "$1000.00" form the attribute value for this row. Likewise, in table 37, "$840.00" is the attribute value (or amount) for "Ending Balance". Note that in this example bold characters are simply depicted as bold instead of placed between appropriate HTML tags, to more readily show the horizontal alignment.

Figure 4A:
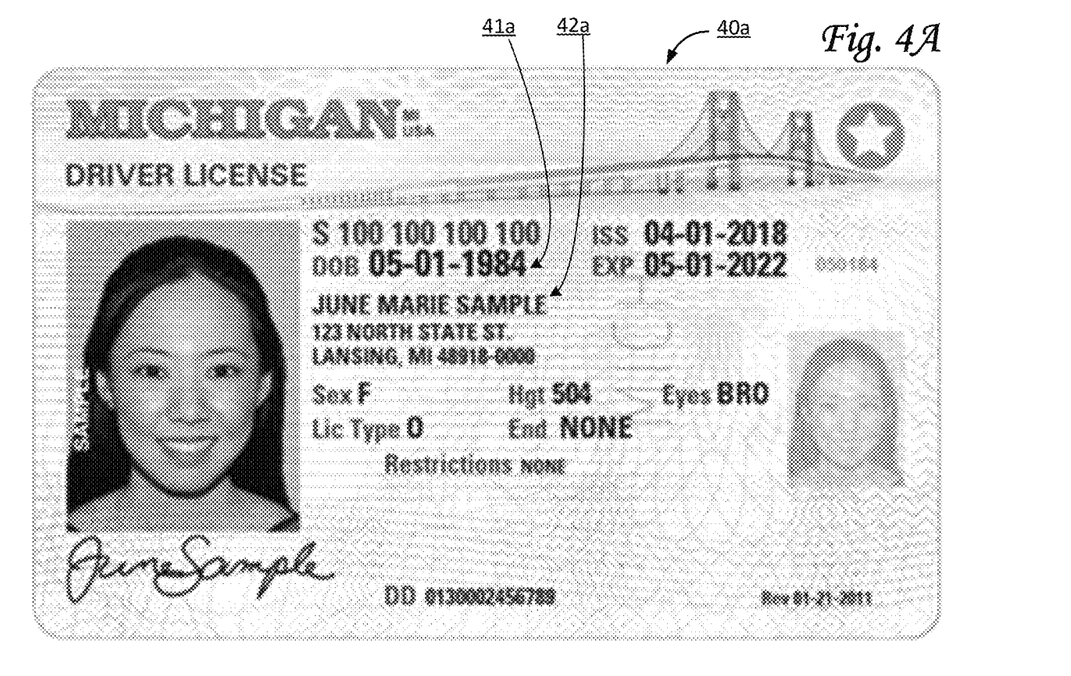

By way of non-limiting example, FIG. 4A illustrates an exemplary electronic source document 40a as may be used in system 100 (of FIG. 1), in accordance with one or more implementations. Exemplary electronic source document 40a may represent a driver license from a particular state. The driver license may include various familiar elements, such as, by way of non-limiting example, the driver's date of birth ("DOB") as indicated by a first content block 41a, the driver's name and address as indicated by a second content block 42a, and other familiar elements of a driver license.

Figure 4B:
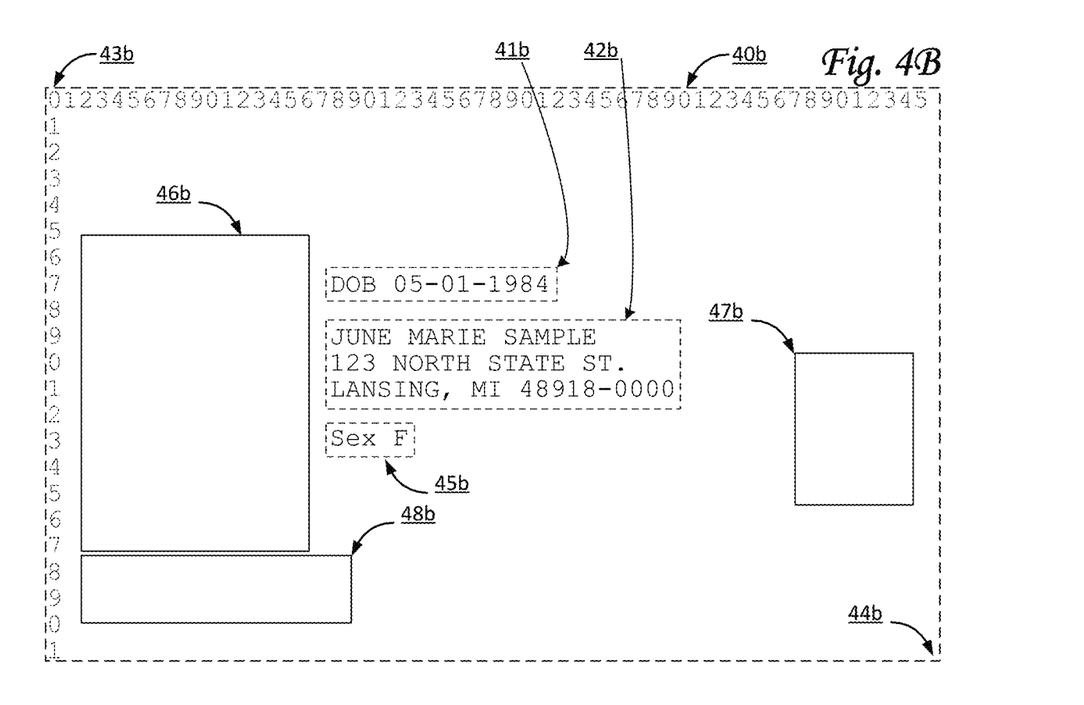

By way of non-limiting example, FIG. 4B illustrates an exemplary mark-up document 40b as may be used in system 100 (of FIG. 1). Mark-up document 40b may have been created and/or generated (by conversion component 110) based on electronic source document 40a in FIG. 4A. Mark-up document 40b may use a text-based document format that includes a grid of fixed-width character positions starting at origin coordinate 43b (the x-y coordinates of this origin are depicted as (0,0)), and extending to the bottom right corner 44*b* of mark-up document 40*b*, having x-y coordinates of (55,21) as depicted in FIG. 4B. These grid positions are merely shown for illustrative purposes in FIG. 4B, and are implicit presentation semantics for this fixed-width text-based document format that would not be visible when presenting mark-up document to a user.

Mark-up document 40*b* may have been generated such that relative positionings and/or alignments are preserved and/or maintained in comparison to exemplary electronic source document 40*a* in FIG. 4A. For example, a first set of characters 41*b* (here, "DOB 05-01-1984") corresponds to first content block 41*a* in FIG. 4A. For example, a second set of characters 42*b* (here, having three lines, the first line being "JUNE MARIE SAMPLE") corresponds to second content block 42*a* in FIG. 4A. In the relative positioning in FIG. 4A, first content block 41*a* is directly above second content block 42*a*. In the corresponding relative positioning in FIG. 4B, first set of characters 41*b* is directly above second set of characters 42*b*, thus maintaining the relative positioning between the documents in FIG. 4A and FIG. 4B. Note that first set of characters 41*b* and second set of characters 42*b* are left-aligned (both having X-coordinate 18 for their respective left-most characters). Note that first set of characters 41*b* has Y-coordinate 7 and second set of characters 42*b* starts at Y-coordinate 9 (but spans three lines, from Y-coordinates 9 to 11). Mark-up document 40*b* may further include bounding boxes 46*b* and 47*b* that correspond to photographs in electronic source document 40*a*, a bounding box 48*b* that corresponds to a signature in electronic source document 40*a*, and a set of characters 45*b* that corresponds to another content block in electronic source document 40*a*.

Referring to FIG. 1, model component 112 may be configured to obtain, access, use, and/or fine-tune a large language model (LLM) 133. In some implementations, large language model 133 may have been trained on at least a million documents. In some implementations, large language model 133 may have been trained on at least 100 million documents. In some implementations, large language model 133 may include and/or be based on a neural network using over a billion parameters and/or weights. In some implementations, large language model 133 may include and/or be based on a neural network using over a 100 billion parameters and/or weights. In some implementations, large language model 133 may be based on Generative Pre-trained Transformer 3 (GPT3). In some implementations, large language model 133 may be based on ChatGPT, as developed by OpenAI™. In some implementations, large language model 133 may be derived from Generative Pre-trained Transformer 3 (GPT3) or a successor of Generative Pre-trained Transformer 3 (GPT3).

Model component 112 may be configured to fine-tune large language model 133 through a set of documents that are encoded in the text-based document format as used by conversion component 110. By virtue of using this text-based document format, large language model 133 may be able to use horizontal and vertical alignment, e.g., to determine whether information is formatted in a column, or a row, or a table. Accordingly, information elements in a column, or a row, or a table may be contextually and/or semantically linked and/or otherwise connected such that large language model 133 may extract information from a particular document in this text-based document format based on knowledge of the explicit presentation semantics and the implicit presentation semantics in the particular document. By way of non-limiting example, exemplary document 35 depicted in FIG. 3B includes table 37, having two columns and eight rows of elements, labels, and/or attribute values.

Referring to FIG. 1, interface component 114 may be configured to provide documents to large language model 133 as input and/or context. For example, interface component 114 may provide a particular mark-up document (e.g., as generated by conversion component 110) to large language model 133 as input and/or context for extraction of information. In some implementations, interface component 114 provides input documents to large language model 133 for extraction of information, including but not limited to user-directed extraction of information. For example, a user may extract the date of birth or hometown of a driver from mark-up document 40*b* in FIG. 4B. For example, a user may extract the net amount spent in a particular week from mark-up document 35 in FIG. 3B (e.g., based on the difference between beginning and ending balance, here $160). For example, a user may extract the actual amount spent in a particular week from mark-up document 35 in FIG. 3B (e.g., based on the difference between beginning and ending balance, and any deposits or additions—or alternatively on the sum of negative attributes in the amount column—such that here, the actual amount spent would be $260). In some implementations, interface component 114 may provide input to large language model 133 after or subsequent to fine-tuning of large language model 133 by model component 112.

Referring to FIG. 1, presentation component 116 may be configured to generate, effectuate, and/or present user interfaces 128 on client computing platforms 104 to users 127. For example, interface component 112 may be configured to present a particular user interface 128 on a particular client computing platform 104 to a particular user. For example, particular user interface 128 may include one or more portions or sections. In some implementations, presentation component 116 may be configured to present one or more graphical user interface elements on one or more user interfaces 128, e.g., responsive to a selection by a user (e.g., through user input received by interface component 114). User interfaces 128 may be configured to enable users 127 to control (e.g., through user input) the extraction of information from one or more mark-up documents. Extraction of information may be performed by large language model 133 (e.g., using the one or more mark-up documents as input). In some implementations, the extraction of information may be user-directed, i.e., controlled by an individual one of users 127 through user input into an individual one of user interfaces 128. For example, a user may direct large language model 133 to extract the date of birth or hometown of a driver from mark-up document 40*b* in FIG. 4B.

In some implementations, user interface 128 may perform certain operations and/or actions pertaining to electronic source documents 123 and/or corresponding mark-up documents. For example, operations may include searching for particular information and/or other content, selecting and/or cropping portions of electronic source documents 123 and/or corresponding character-based representations, as well as combinations of filtering, detecting, searching, selecting, cropping, transforming, converting, and/or other operations. For example, specific user input may enable a user to perform a search and/or a selection of information in a particular electronic source document 123 based on the corresponding mark-up document. For example, such a search may be for a name, address, date of birth, and/or other specific information. Through combinations of specific user input (representing specific operations and/or actions pertaining to electronic source documents 123 and/or corresponding mark-up documents), a user may not only extract particular information (say, an address) from one document (say, a first driver license from a particular state), but rather may have a template to extract similar particular information from a set of similar documents (say, driver licenses from the same particular state, or at least from driver licenses using a similar design as the first driver license).

As used herein, the term "extract" and its variants refer to the process of identifying and/or interpreting information that is included in a document, whether performed by determining, measuring, calculating, computing, estimating, approximating, interpreting, generating, and/or otherwise deriving the information, and/or any combination thereof. In some implementations, extracted information may have a semantic meaning, including but not limited to opinions, judgement, classification, and/or other meaning that may be attributed to human interpretation. For example, in some implementations, some types of extracted information need not literally be included in a particular electronic source document, but may be a conclusion, classification, and/or other type of result of (human and/or machine-powered) interpretation of the contents of the particular electronic source document. In some implementations, the extracted information may have been extracted by one or more extraction engines. For example, a particular extraction engine (referred to as an OCR engine) may use a document analysis process that includes optical character recognition (OCR). For example, a different extraction engine (referred to as a line engine) may use a different document analysis process that includes line detection. For example, another extraction engine (referred to as a barcode engine) may use a document analysis process that includes detection of barcodes, Quick Response (QR) codes, matrices, and/or other machine-readable optical labels. Alternatively, and/or simultaneously, in some implementations, the extracted information may have been extracted by a document analysis process that uses machine-learning (in particular deep learning) techniques. For example, (deep learning-based) computer vision technology may have been used. For example, a convolutional neural network may have been trained and used to classify (pixelated) image data as characters, photographs, diagrams, media content, and/or other types of information. In some implementations, the extracted information may have been extracted by a document analysis process that uses a pipeline of steps for object detection, object recognition, and/or object classification. In some implementations, the extracted information may have been extracted by a document analysis process that uses one or more of rule-based systems, regular expressions, deterministic extraction methods, stochastic extraction methods, and/or other techniques. In some implementations, particular document analysis processes that were used to extract the extracted information may fall outside of the scope of this disclosure, and the results of these particular document analysis processes, e.g., the extracted information, may be obtained and/or retrieved by a component of system 100.

In some implementations, server(s) 102, client computing platform(s) 104, and/or external resources 120 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 128 may be configured to facilitate interaction between users 127 and system 100 and/or between users 127 and client computing platforms 104. For example, user interfaces 128 may provide an interface through which users may provide information to and/or receive information from system 100. In some implementations, user interface 128 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, and/or other user interface devices configured to receive and/or convey user input. In some implementations, one or more user interfaces 128 may be included in one or more client computing platforms 104. In some implementations, one or more user interfaces 128 may be included in system 100.

External resources 120 may include sources of information outside of system 100, external entities participating with system 100, and/or other resources. In some implementations, external resources 120 may include a provider of documents, including but not limited to electronic source documents 123, from which system 100 and/or its components (e.g., source component 108) may obtain documents. In some implementations, external resources 120 may include a provider of information, including but not limited to extracted information 125, from which system 100 and/or its components (e.g., conversion component 110) may obtain information and/or documents. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server 102 and/or system 100 may be provided by resources included in one or more client computing platform(s) 104.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 114, and/or 116, and/or other components. Processor(s) 124 may be configured to execute components 108, 110, 112, 114, and/or 116, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 124 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 124 may be configured to execute one or more additional components that may perform some or all of the functionality attributed below to one of components 108, 110, 112, 114, and/or 116.

Figure 2:
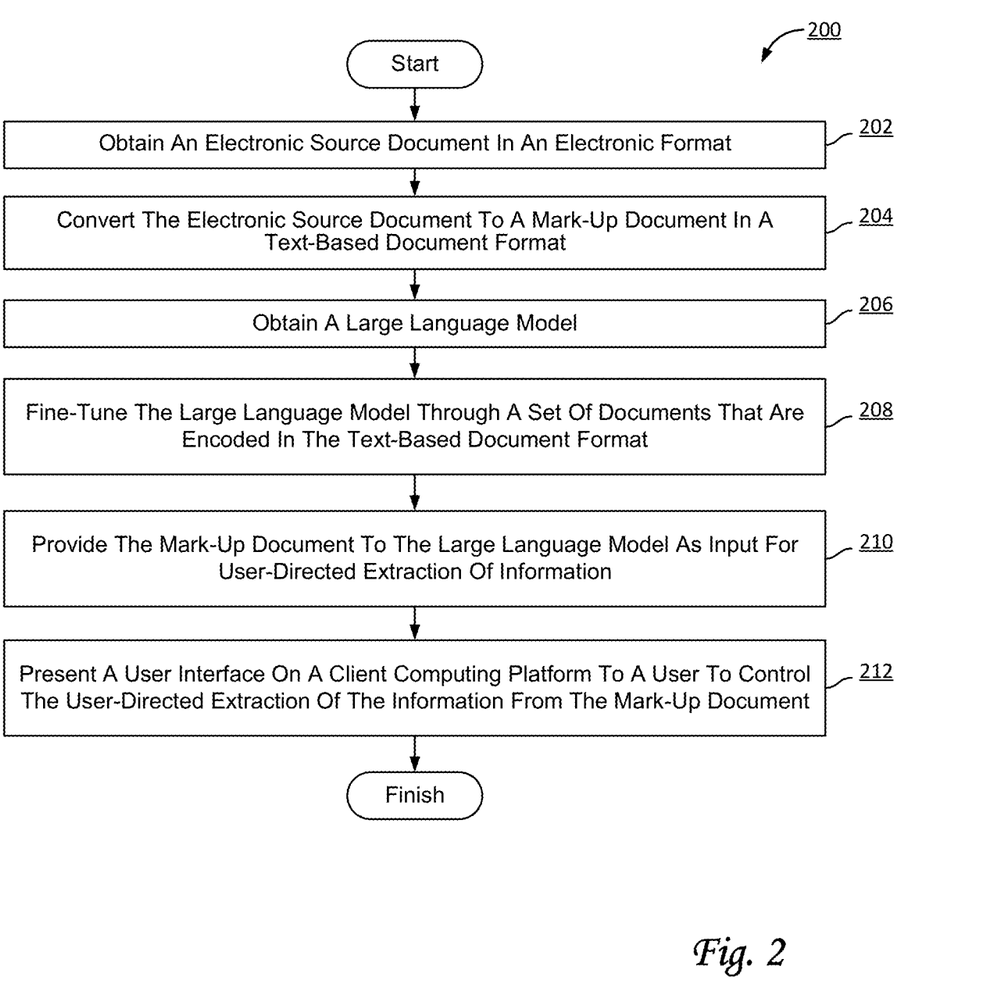
FIG. 2 illustrates a method for using a text-based document format to provide context for a large language model, in accordance with one or more implementations.

FIG. 2 illustrates a method 200 for using a text-based document format to provide context for a large language model, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202, an electronic source document is obtained that has an electronic format. The electronic format encodes visual information that represents human-readable information positioned on multiple line positions. The visual information includes blocks of content. The blocks of content include a first block of content and a second block of content on different ones of the multiple line positions. The first block of content and the second block of content have a particular horizontal alignment with respect to each other. In some embodiments, operation 202 is performed by a source component the same as or similar to source component 108 (shown in FIG. 1 and described herein).

At an operation 204, the electronic source document is converted to a mark-up document in the text-based document format. The text-based document format supports a mark-up language. The mark-up language includes explicit presentation semantics for presentations of documents and implicit presentation semantics for horizontal placements and vertical placements of characters in the presentations of the documents. The human-readable information in the blocks of content are included in the mark-up document so as to preserve relative horizontal alignment between the first block of content and the second block of content encoded in the electronic source document. The mark-up document includes a first set of characters that corresponds to the first block of content and a second set of characters that corresponds to the second block of content. A first horizontal position of the first set of characters and a second horizontal position of the second set of characters within the mark-up document reflects the particular horizontal alignment between the first block of content and the second block of content. In some embodiments, operation 204 is performed by a conversion component the same as or similar to conversion component 110 (shown in FIG. 1 and described herein).

At an operation 206, a large language model is obtained that has been trained on at least a million documents. The large language model includes a neural network using over a billion parameters and/or weights. In some embodiments, operation 206 is performed by a model component the same as or similar to model component 112 (shown in FIG. 1 and described herein).

At an operation 208, the large language model is fine-tuned through a set of documents that are encoded in the text-based document format. In some embodiments, operation 208 is performed by a model component the same as or similar to model component 112 (shown in FIG. 1 and described herein).

At an operation 210, the mark-up document is provided to the large language model as input for user-directed extraction of information. In some embodiments, operation 210 is performed by an interface component the same as or similar to interface component 114 (shown in FIG. 1 and described herein).

At an operation 212, a user interface is presented on a client computing platform to a user. The user interface enables the user, through user input, to control the user-directed extraction of the information from the mark-up document. The user-directed extraction of the information is performed by the large language model. In some embodiments, operation 212 is performed by an interface component and/or a presentation component the same as or similar to interface component 114 and/or presentation component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for using a text-based document format to provide context for a large language model, the system comprising:
   one or more hardware processors configured by machine-readable instructions to:
      obtain an electronic source document in an electronic format, wherein the electronic format encodes visual information that represents human-readable information positioned on multiple line positions, wherein the visual information includes blocks of content, wherein the blocks of content include a first block of content and a second block of content on different ones of the multiple line positions, wherein the first block of content and the second block of content have a particular horizontal alignment with respect to each other, and wherein the first block of content and the second block of content represent characters;
      convert the electronic source document to a mark-up document in the text-based document format, wherein the text-based document format uses a grid of character positions such that individual character positions in the grid are uniquely indicated by grid character coordinates of the grid, wherein the text-based document format supports a mark-up language, wherein the mark-up language includes explicit presentation semantics for presentations of documents and implicit presentation semantics for horizontal placements and vertical placements of characters in the presentations of the documents, wherein the human-readable information in the blocks of content is converted into in the mark-up document so as to preserve relative horizontal alignment between the first block of content in the electronic source document and the second block of content in the electronic source document, wherein the mark-up document includes a first set of characters converted from the characters represented in the first block of content in the electronic source document and a second set of characters converted from the characters represented in the second block of content in the electronic source document, wherein the first set of characters and the second set of characters are part of a column of information, and wherein the grid character coordinates for a first horizontal position of the first set of characters in the grid and the grid character coordinates for a second horizontal position of the second set of characters in the grid within the mark-up document reflect the particular horizontal alignment between the first block of content and the second block of content;
      obtain a large language model that has been trained on at least a million documents, wherein the large language model includes a neural network using over a billion parameters and/or weights;
      fine-tune the large language model through a set of documents, wherein the set of documents is encoded in the text-based document format that uses a particular grid of character positions, such that the character positions in the particular grid are uniquely indicated by particular grid character coordinates of the particular grid;
      provide the mark-up document that has been converted from the electronic source document to the large language model as input for user-directed extraction of information; and
      present a user interface on a client computing platform to a user, wherein the user interface is configured to enable the user, through user input, to control the user-directed extraction of the information from the mark-up document, wherein the user-directed extraction of the information is performed by the large language model.

2. The system of claim 1, wherein the electronic format of the electronic source document is one of Portable Document Format (PDF), Portable Network Graphics (PNG), or Joint Photographic Experts Group (JPG).

3. The system of claim 1, wherein the particular horizontal alignment is one of left-aligned, centered, or right-aligned.

4. The system of claim 1, wherein the mark-up language is a subset of HyperText Markup Language (HTML).

5. The system of claim 1, wherein the large language model is based on Generative Pre-trained Transformer 3 (GPT3).

6. The system of claim 1, wherein the large language model is derived from Generative Pre-trained Transformer 3 (GPT3).

7. The system of claim 1, wherein X-coordinates of the first set of characters in the grid correspond to X-coordinates of the second set of characters in the grid.

8. The system of claim 7, wherein the first set of characters and the second set of characters represent amounts of a currency.

9. The system of claim 8, wherein the first set of characters is on a first line with a first row label, wherein the first row label is positioned at a different horizontal position than the first set of characters and at a similar vertical position as the first set of characters, wherein the second set of characters is on a second line with a second row label, wherein the second row label is horizontally aligned with the first row label and vertically aligned with the second set of characters, and wherein the first set of characters, the second set of characters, the first row label, and the second row label are part of a table of information.

10. The system of claim 1, wherein the user-directed extraction of the information as performed by the large language model is based on a table of information in the mark-up document.

11. A method of using a text-based document format to provide context for a large language model, the method comprising:

obtaining an electronic source document in an electronic format, wherein the electronic format encodes visual information that represents human-readable information positioned on multiple line positions, wherein the visual information includes blocks of content, wherein the blocks of content include a first block of content and a second block of content on different ones of the multiple line positions, wherein the first block of content and the second block of content have a particular horizontal alignment with respect to each other, and wherein the first block of content and the second block of content represent characters;

converting the electronic source document to a mark-up document in the text-based document format, wherein the text-based document format uses a grid of character positions such that individual character positions in the grid are uniquely indicated by grid character coordinates of the grid, wherein the text-based document format supports a mark-up language, wherein the mark-up language includes explicit presentation semantics for presentations of documents and implicit presentation semantics for horizontal placements and vertical placements of characters in the presentations of the documents, wherein the human-readable information in the blocks of content is converted into the mark-up document so as to preserve relative horizontal alignment between the first block of content in the electronic source document and the second block of content in the electronic source document, wherein the mark-up document includes a first set of characters converted from the characters represented in the first block of content in the electronic source document and a second set of characters converted from the characters represented in the second block of content in the electronic source document, wherein the first set of characters and the second set of characters are part of a column of information, and wherein the grid character coordinates for a first horizontal position of the first set of characters in the grid and the grid character coordinates for a second horizontal position of the second set of characters in the grid within the mark-up document reflect the particular horizontal alignment between the first block of content and the second block of content;

obtaining a large language model that has been trained on at least a million documents, wherein the large language model includes a neural network using over a billion parameters and/or weights;

fine-tuning the large language model through a set of documents, wherein the set of documents is encoded in the text-based document format that uses a particular grid of character positions, such that the character positions in the particular grid are uniquely indicated by particular grid character coordinates of the particular grid;

providing the mark-up document that has been converted from the electronic source document to the large language model as input for user-directed extraction of information; and presenting a user interface on a client computing platform to a user, wherein the user interface enables the user, through user input, to control the user-directed extraction of the information from the mark-up document, wherein the user-directed extraction of the information is performed by the large language model.

12. The method of claim 11, wherein the electronic format of the electronic source document is one of Portable Document Format (PDF), Portable Network Graphics (PNG), or Joint Photographic Experts Group (JPG).

13. The method of claim 11, wherein the particular horizontal alignment is one of left-aligned, centered, or right-aligned.

14. The method of claim 11, wherein the mark-up language is a subset of HyperText Markup Language (HTML).

15. The method of claim 11, wherein the large language model is based on Generative Pre-trained Transformer 3 (GPT3).

16. The method of claim 11, wherein the large language model is derived from Generative Pre-trained Transformer 3 (GPT3).

17. The method of claim 11, wherein X-coordinates of the first set of characters in the grid correspond to X-coordinates of the second set of characters in the grid.

18. The method of claim 17, wherein the first set of characters and the second set of characters represent amounts of a currency.

19. The method of claim 18, wherein the first set of characters is on a first line with a first row label, wherein the first row label is positioned at a different horizontal position than the first set of characters and at a similar vertical position as the first set of characters, wherein the second set of characters is on a second line with a second row label, wherein the second row label is horizontally aligned with the first row label and vertically aligned with the second set of characters, and wherein the first set of characters, the second set of characters, the first row label, and the second row label are part of a table of information.

20. The method of claim 11, wherein the user-directed extraction of the information as performed by the large language model is based on a table of information in the mark-up document.

* * * * *